United States Patent Office  3,320,209
Patented May 16, 1967

3,320,209
EPOXY RESINS
Bart J. Bremmer, Midland, Mich., assignor to The Dow Chemical Company, Midland, Mich., a corporation of Delaware
No Drawing. Filed Oct. 11, 1962, Ser. No. 229,981
12 Claims. (Cl. 260—47)

The invention is concerned with a novel epoxy resin composition having improved properties.

Epoxy resins broadly are well known and widely used. A significant characteristic of the structure of epoxy resins is that they contain an average of more than one terminal oxirane group per molecule, preferably an average of at least about 1.6 per molecule. The term "oxirane," as used herein, means the group

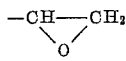

The known resins are prepared, in general, by one of two following procedures:

(1) By reacting a dihalohydrin or epihalohydrin with a polyhydric comound, in the proper molar proportions in the presence of a suitable catalyst, and dehydrohalogenating the chlorohydrin ether formed to produce substantially a diglycidyl ether or polyether of the polyhydric compound employed or (2) By reacting either a cyclic or an acyclic diolefin with a peracid or peroxide to produce substantially a di- or polyepoxide of the diolefin. The epoxy resins made according to either procedures are liquid or low-melting solids which are readily converted to hard, durable, corrosion- and abrasion-resistant resins of the thermoset type by admixture therewith of a curing agent selected from either (1) those which coreact with the epoxy resin, e.g., a primary or secondary amine or a dicarboxylic acid or anhydride thereof, which enters into a cross-linking reaction wth the oxirane groups and also with the hydroxyl groups of the resin (if present), or (2) a catalyst which effects cross-linking directly between the oxirane groups of the epoxy resin, without it itself entering into the cross-linked product, e.g., a Lewis acid such as BF₃ and organic complexes thereof, or a tertiary amine.

Epoxy resins are well adapted for general use as formable or moldable resins which cure to hard, durable, high-strength solids and which possess properties especially suitable for laminating, coating, and casting of resin shapes generally, for patching and caulking, and as a binder with aggregate, bitumen, and the like for traffic-bearing surfaces Known epoxy resins, despite their unusual suitability for a wide variety of uses, are sometimes too viscous for satisfactory mixing and application for specific uses. Cured conventional epoxy resins also are water absorbent to a small but possible troublesome extent and more or less flammable and therefore are not fully suitable for uses requiring prolonged exposure to water and high temperature. Attempts to meet the existent need for an epoxy resin of lower viscosity have included the admixture therewith of liquid diluents. Such attempts, however, have resulted in resins of decreased strength properties and have, therefore, not led to accepted procedures in general. Some attempts to produce a resin of lower viscosity have been quite successful when such properties were obtained in combination with other specific properties. One such low viscosity resin is that described in my copending application Ser. No. 123,413, filed July 12, 1961 now abandoned. This resin made by reacting a sulfur chloride with an aryl hydroxy compound, has a particularly fast curing rate and, though especially suitable for specific uses, is not fully acceptable for all uses of epoxy resins. Attempts have also been made with some success to provide epoxy resins having desired increased resistance to burning. Resistance to burning is customarily measured by A.S.T.M. Test No. D 635–56T to ascertain whether or not the resin is self-extinguishing. Self-extinguishing, as defined in the test, means that a test sample does not continue to burn after the removal from contact therewith of an igniting source; one such resin made by reacting a halogenated polyphenol and a dihalohydrin or an epihalohydrin, is described in my copending application, Ser. No. 79,992, filed January 3, 1961 now abandoned. A need for a lower viscosity in such resin for certain end uses still remains.

Despite the advantages afforded by the inventions described in the above-identified patent applications, there still remains a need for an epoxy resin which has in combination, a lower viscosity to facilitate the admixture therewith of other epoxy resins and of a suitable curing agent either alone or in such admixture and for subsequent applications requiring a fluid state, and which is self-extinguishing but retains the desirable strength, corrosion resistance, low water absorption, abrasion resistance, and electrical insulation properties now found individually, rather than occurring together in known epoxy resins.

The principal object of the invention is to provide a resin which meets these and related needs. A further object is to provide a resin of excellent properties at more economic costs. How the resin of the invention attains these and related objects, its manner of preparation, and its more salient properties are set forth in the ensuing description.

The invention, accordingly, is a new improved epoxy resin which is especially adapted for making an improved self-extinguishing resin by admixing therewith a cross-linking agent without loss of the other desirable properties associated with known epoxy resins.

The resin of the invention has the generic formula: YZ wherein Y is

JQJ, Q always being attached directly to Z and J therein being selected from the class consisting of oxirane-containing Groups 1 to 5 below:

(1)

$$\underset{\diagdown O \diagup}{CH_2-CH-CH_2-}$$

(2)

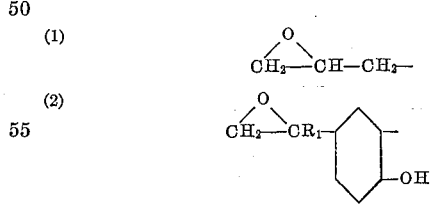

in which R₁ is H or the methyl group, (3)

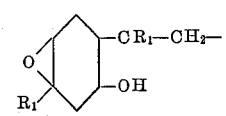

in which $R_1$ has the significance given above, (4) 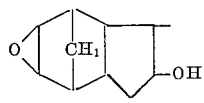

and (5) 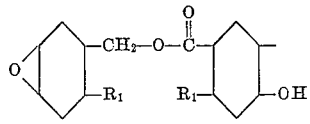

in which $R_1$ has the significance given above; Q therein being selected from the class consisting of 6 to 11 below, wherein a carbon atom (other than that attached to N) of a phenylamine group of Q is always attached directly to a Z group:

(6) 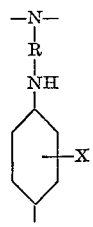

J groups being attached directly to N and in which R is an alkylene group of from 1 to 6 carbon atoms and in which X represents from 1 to 4 substituents sufficient thereof being selected from the class consisting of bromine and chlorine to give a percent by weight of bromine of at least about 10 percent or a percent by weight of chlorine of at least about 18 percent (or a calculable intermediate value when both bromine and chlorine are present) in the final product when cured and the remaining X substituents being bromine, chlorine, hydrogen, or alkyl groups of 1 to 4 carbon atoms:

(7) 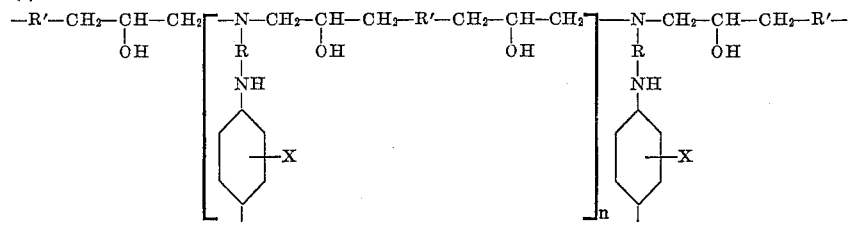

J groups being attached directly to R' groups and in which R and X have the significance given above, $n$ is from zero to about 20, and in which R' is selected from the class consisting of $a$ to $d$ below:

(a) 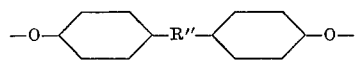

in which R'' is an alkylidene group of 1 to 5 carbon atoms, e.g.,

(b) 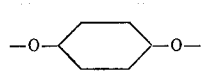

(c) 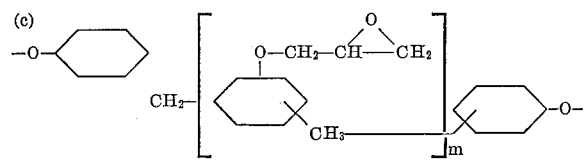

in which $m$ is 1 to 5, and (d)    $-O-(CH_2)_p-O-$ in which $p$ is 2 to 6;

(8) 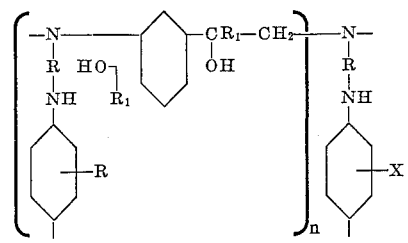

J groups being attached directly to N and in which $R, R_1, X$, and $n$ have the significance given above;

(9) 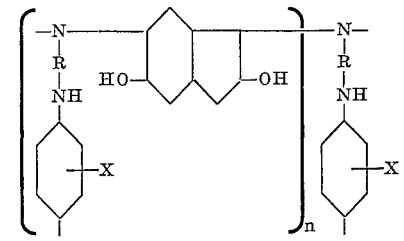

J groups being attached directly to N and in which R, X, and $n$ have the significance given above;

(10) 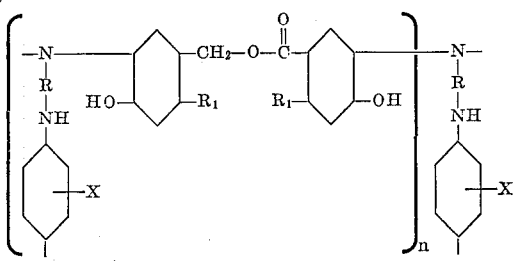

J groups being attached directly to N and in which R, $R_1$, and $n$ have the significance given above;

(11) 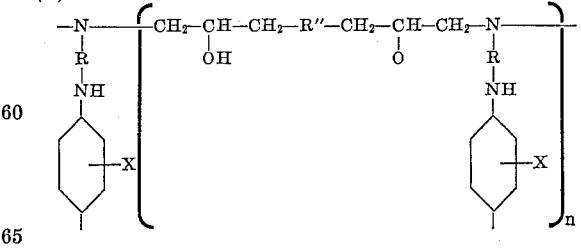

J groups being attached directly to N and in which R, X, and $n$ have the significance given above, and R'' is selected from the $a$ and $b$ embodiments of R' given above; and wherein Z is selected from the class consisting of X and Y and is as aforesaid, always attached to a carbon atom of the phenylamine group of course other than that to which the N is attached and usually para thereto.

Illustrative of the invention when Z=X and X is chlorine, is N, N-bis(2,3-epoxypropyl)-N'-(pentachlorophenyl) ethylenediamine, having the formula:

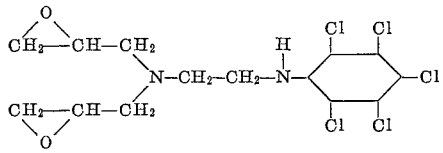

Illustrative of the invention when Z=Y is p,p'-bis[N-bis(2,3-epoxypropyl)-N'-(tetrabromophenyl)ethylenediamine] having the formula:

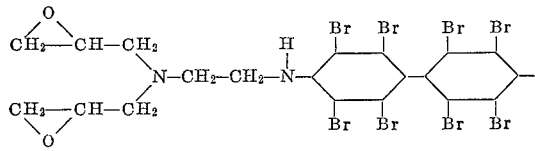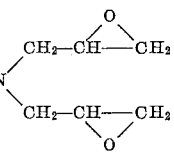

In preparing the resin of the invention, represented by those formulae above having repeating units therein, wherein Z is Y, care must be exercised so as not to obtain a mixture which gels in the mixing stage and therefore cannot be cast or molded satisfactorily. Accordingly, the value of $n$ is usually from 0 to not more than 2 or 3 when Z=Y.

The new resins of the invention may be made by one of the modes of procedure designated A, B, C, D, and E below:

*Procedure A*

Step 1.—A primary aliphatic polyamine (the term herein used to mean containing two or more amino groups), having between 1 and 6 carbon atoms, is reacted with a ring-halogenated aromatic hydrocarbon such as benzene, biphenyl, triphenyl, or an alkyl-substituted substituent thereof, e.g., toluene or one of the xylenes, to produce a halogenated N-phenylalkylenepolyamine. Illustrative of the compound so formed is

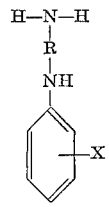

wherein each occurrence of X represents H, Br, Cl, or an alkyl group, a sufficient number of X substituents, however, being Br or Cl to render the subsequently cured resin self-extinguishing, and R is an alkylene group of from 1 to 6 carbon atoms.

Step 2.—The compound of Step 1 is epoxylated. Epoxylation is usually carried out by admixing the brominated or chlorinated N-phenylalkylenepolyamine with an excess over the stoichiometric quantity of epibromohydrin or epichlorohydrin required for reaction therewith in a suitable reaction vessel and, while heating at reflux temperature, adding slowly thereto an aqueous solution of an alkali metal hydroxide until a slight excess thereof over that required to react with the halogen of the epihalohydrin is provided. A resin of the invention is thus produced. The resin may be referred to as an N,N-diglycidyl-N'-halophenylethylenepolyamine.

*Procedure B*

The N,N - diglycidyl-N'-halophenylethylenepolyamine, i.e., the epoxylated product made according to Procedure A, may be mixed with a conventional epoxy resin such as the diglycidyl ether or polyether of 4,4'-isopropylidenediphenol or with a polyglycidyl ether of a novolac resin to make a blend thereof. Since the halogen, particularly when the brominated compound is employed, is an especially large proportion by weight of the molecule, a known epoxy resin can be made self-extinguishing, i.e., can be provided with at least 10% of bromine or at least 18% of chlorine, or a calculable intermediate value thereof when both are present, by admixing it with a minor proportion of the halogenated resin of the invention without objectionably affecting the desirable physical properties of the conventional epoxy resins.

*Procedure C*

A primary aliphatic polyamine is reacted with a halogenated aromatic compound, e.g., benzene or diphenyl, as in the first step in A above but without reacting the product so made with a halohydrin as in the second step thereof, and the product is reacted with an epoxy resin, e.g., the diglycidyl ether of 4,4'-isopropylidenediphenol or of propylene glycol, including the higher moleculuar weight diglycidyl ethers containing oxyarylene or oxyalkylene repeating units, in amounts of each to provide a molar excess of oxirane groups present in the epoxy resin over available amine hyrogen atoms present in the reaction product of the halogenated N-phenylalkylenepolyamine.

The following structure is illustrative of the type of compound so formed:

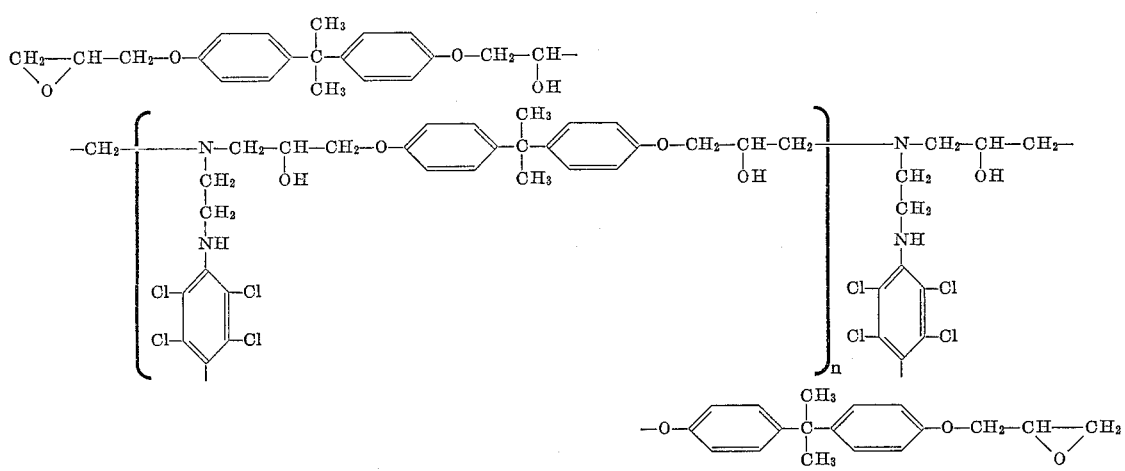

wherein $n$ is 0 to about 20.

Procedure D

The reaction product of a primary aliphatic polyamine and a halogenated aromatic compound (prepared according to Step 1 of Procedure A above but without Step 2 thereof, i.e., without the epoxylation step) is prepared similarly to Procedure C above except that, instead of the glycidyl ether there employed, a non-ether type diepoxide is employed. The amounts of the reactants are such as to provide a molar excess of oxirane groups over the amine hydrogen atoms. The following structure when vinylcyclohexene dioxide is employed as the diepoxide, is illustrative of the type of compound so formed:

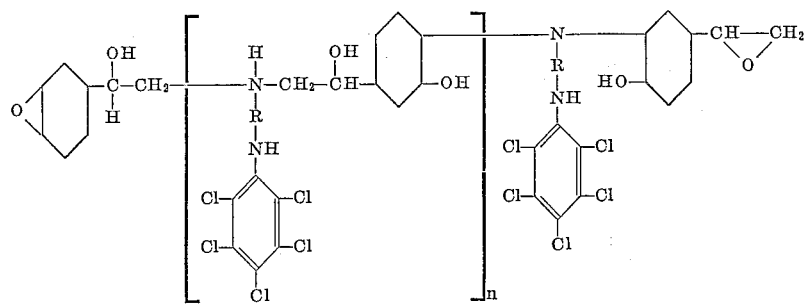

R and n having the significance given above.

Other diepoxides suggested for use in this embodiment of the invention are: dicyclopentadiene dioxide, dipentene dioxide, and the dicyclodiepoxy carboxylates, e.g. 3,4-epoxy-6-methylcyclomethyl-3-4-epoxy-6-methylcyclohexanecarboxylate. (Additional information on such diepoxides may be obtained from the Union Carbide Chemicals Company, 270 Park Avenue, New York 17, New York.) The following formula is illustrative of this embodiment of the invention when 4,4-isopropylidenediphenol, commonly called bisphenol A, is employed with the N,N-diglycidyl-N'-halophenylethylenediamine prepared according to Procedure A above:

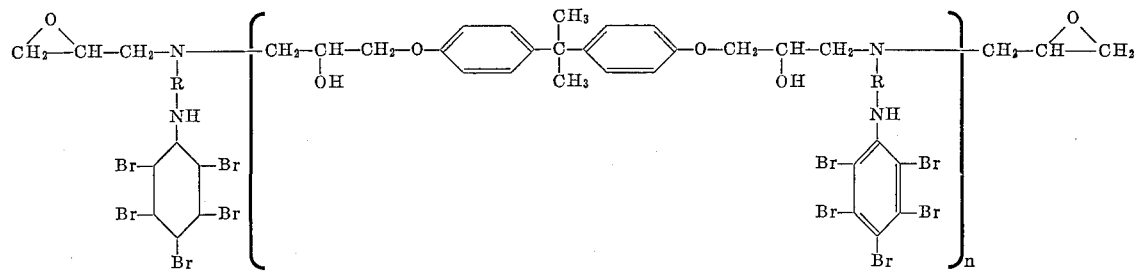

R and n have the values above stated.

In preparing any of the embodiments of the resin of the invention, when no more than one X substituent on each phenyl group is an alkyl group of 1 to 2 carbon atoms and the remaining substituents of the phenyl group are either H or halogen, the required percent of halogen in the resin to impart self-extinguishment can often be provided by the presence of no more than one bromine substituent on each phenyl group or by no more than two chlorine substitutents on each phenyl group.

The compositions made as described according to Procedures A, B, C, or D, above may be readily cured to a cross-linked resin by admixing therewith any of the known curing or hardening agents employed to cross-link epoxy resins. Cure may be effected at room temperature or above, but is it preferably effected by subjecting the admixture to advanced heat, e.g., between 100° and 225° C. for from 2 to 24 hours, the length of time recommended being inverse to the temperature employed.

The cross-linking agent to employ with the resin as above described may be either a coreactant curing agent of the nature of a primary or secondary amine or mixture thereof, including the polyamines, or a dicarboxylic acid or anhydride thereof, or a polyphenol or diglycidyl ether or polyether, or it may be a catalytic-type curing agent, e.g., a tertiary amine or a Lewis acid. The cross-linking agent preferred is a polyalkylenepolyamine, e.g., diethylenetriamine or triethylenetetramine. The coreactant type curing agent is employed in an amount sufficient to provide about one labile H atom per oxirane group present in the resin. The catalytic type is employed in an amount between about 0.5 and about 5.0 percent by weight of the resin.

The following examples are illustrative of the practice of the invention. They are not to be construed as limiting the scope thereof but as representing suitable reactants and reaction conditions which produce the resin of the invention.

Examples 1 to 3 illustrate the compostion of the invention prepared according to Procedure A above.

EXAMPLE 1

N-pentachlorophenylethylenediamine was prepared according to the procedure set out in Example 1 of U.S. Patent 2,829,164 which broadly consists of adding 100 grams of hexachlorobenzene, over a period of 30 minutes, to 800 milliliters of boiling ethylenediamine (117° C.), in a suitable reaction vessel, boiling the resulting reaction mixture for an additional 15 minutes, cooling to room temperature, and diluting to a volume of 3 liters with water to produce a white filterable precipitate consisting of about 96% by weight N-pentachlorophenylethylenediamine.

To prepare the epoxy resin compositon of the invention, a 500 milliliter flask, equipped with a stirrer, thermometer, funnel, reflux condenser and water separator, and an epichlorohydrin return line from the separator, was charged with 77.1 grams (0.5 equivalent weight), of the N-pentachlorophenylethylenediamine prepared above and 231.2 grams (2.5 equivalent weights) of epichlorohydrin. The mixture was heated to and maintained at about 104° C. while 41.6 grams (0.52 equivalent weight) of NaOH, as a 50% aqueous solution thereof, was added slowly thereto over a period of about 1 hour. The epichlorohydrin-water azeotropic mixture was continuously distilled off and condensed, the water separated therefrom, and the epichlorohydrin returned to the reaction vessel. Following the addition of the NaOH solution, the temperature was raised to 135° C. and the pressure reduced to an absolute pressure of about 2 inches of mercury and the remaining epichlorohydrin volatilized off. Thereafter 100 milliters of toluene were added and the NaCl formed during the reaction separated by filtration. The toluene was then volatilized off at reduced pressure until there was reached a temperature of 160° C. and an absolute pressure of about 2 inches of mercury. The resin product formed was analyzed and shown to be substantially N,N-bias(2,3-epoxypropyl)N'-(pentachlorophenyl)ethylenediamine. The yield was 104.5 grams which was 99.4% of that theoretically possible. The epoxide equivalent weight of the product so made was 239. The theoretical epoxide equivalent weight was 209.7 which shows that the average number of oxirane groups per molecule was between about 1.7 and 1.8. The viscosity according to the Gardner Scale was Z–4.

A sample of the resin so made was then cured by admixing therewith an amount of methylene dianiline to provide the stoichiometric quantity for reaction with the oxirane groups present and heating according to the following curing schedule: 3½ hours at 80° C.; 2½ hours at 115° C.; 2 hours at 145° C. The cured sample was analyzed for chlorine and found to contain 42.3% by weight thereof. The heat distortion temperature was ascertained and found to be 107° C.

EXAMPLE 2

Example 1 was repeated except that hexabromobenzene was employed to make N-pentabromophenylethylenediamine, for epoxylation, instead of the N-pentachlorophenylethylenediamine of Example 1. The product so formed was 73.5% of the amount theoretically possible based on the hexabromobenzene employed. Titration of an aqueous methanol solution thereof with acid showed it to have an amine equivalent weight of 531.8 which is not significantly different from the theoretical amine equivalent weight of 531.0. The reaction product so made was then epoxylated according to the following recipe:

N-pentabromophenylethylenediamine: 265 grams (1 equivalent);
Epichlorohydrin: 462.5 grams (5 equivalents);
50% by weight aqueous NaOH solution: 88.8 grams (1:11 equivalent).

The procedure was substantially the same as that followed in Example 1 above. The epoxy resin of the invention was produced in a 94.4% yield based on the theoretical amount possible. The resin had an epoxide equivalent weight of 402 representing an average of 1.6 oxirane groups per molecule. (The theoretical epoxide equivalent weight was 321.5.) The resin so made is chlorine (which provides an average of about 8 chlorine atoms per biphenyl molecule) was then added slowly thereto, over a period of 30 minutes accompanied by agitation. (An excess of ethylenediamine was thus provided to serve also as the reaction medium). The reaction mixture was then refluxed for 8 hours, thereafter cooled to about room temperature, and 17.6 grams of a 50% by weight aqueous NaOH solution added thereto to neutralize the HCl formed during the reaction. There are then added 250 milliliters of toluene and the resulting toluene solution washed with water until it was substantially free of chloride ions. The toluene was then volatilized from the solution. A semi-solid product, weighing 54.6 grams, remained. The theoretical yield was 55 grams which, by calculation, shows the yield to be 99.4% of the theoretical based on the chlorinated biphenyl employed. The product was further analyzed and found to consist of 45% chlorine. Titration of an aqueous methanol solution of the product showed it to have an amine equivalent weight of 262 compared to the theoretical of 243. The product was that having the formula below:

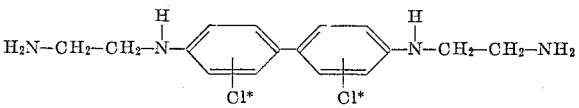

*The average number of chlorine atoms per molecule, i.e., per biphenyl group, was 6.5.

The preparation of the above compound is described more fully in patent application S.N. 229,982 filed concurently herewith now United States Patent 3,164,634.

The chlorinated biphenyl-bis(ethylenediamine) made above was then reacted with epichlorohydrin in the presence of NaOH as follows: 126.4 grams (about 1 equivalent weight) of the chlorinated biphenyl-bis(ethylenediamine) prepared above and 462.5 grams (5.0 equivalent weights) of epichlorohydrin were put in a reaction vessel equipped with stirrer, heating means, reflux and water trap with return line to the vessel. 88 grams of a 50% aqueous solution of NaOH (1.1 equivalent weights) were added therto while the reaction mixture was being heated at reflux conditions for a period of about 8 hours. The resin product was separated from excess epichlorohydrin and water, dissolved in toluene, the toluene recovered, and the resin washed with water and thereafter dried. The resin product was found to be substantially: p,p'-bis[N-bis(2,3-epoxypropyl)-N'-(polychlorobiphenyl)ethylenediamine]. The yield was 175.0 grams which was approximately 96% of that theoretically possible. The resin showed the following properties: an epoxide equivalent weight of 210 and a Gardner color of 13–14. The resin was considered to have the following structure:

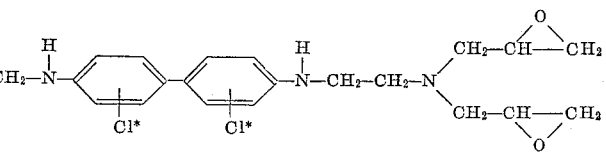

*The average number of chlorine atoms per molecule was 6.5, as in the biphenylaminobis(dialkylene diamine) employed.

curable by admixture therewith of any of the known curing agents for epoxy resins, preferably followed by a heating period.

EXAMPLE 3

This example was carried out by first reacting ethylenediamine with a chlorinated biphenyl to make a chlorobiphenyl-bis(diethylenediamine), having the formula set out hereinafter, and thereafter epoxidizing it. The procedure was as follows: A vessel of the type employed in the example above was charged with 250 grams of ethylenediamine and heated to 117° C. A chlorinated biphenyl, in the amount of 50 grams, containing 66.3% by weight The full amount of the above material thus prepared, i.e., the entire 175 grams, was admixed with 51 grams (containing about 1.03 amine hydrogen equivalents) of methylene dianiline and the resulting mixture heated for 4 hours at 165° C. to effect a cure. The cured resin so made was examined and found to have a heat distortion temperature according to A.S.T.M. Test D 648–56T of 141° C. and a Barcol Hardness of 38. The resin was then post cured by heating an additional 4 hours at 204° C. The heat distortion and hardness were again obtained and found to be 142° C. and 38, respectively. In other words, the additional exposure to heat appeared to have insignificant effect upon these properties of the resin of the invention.

To show the adaptability of the resin of the invention for admixture with known epoxy resins according to Procedure B above, Examples 4 to 7 were run.

EXAMPLE 4

A blend of resins consisting of the compound prepared in Example 1, viz, N,N-bis(2,3-epoxypropyl)-N'-(pentachlorophenyl)ethylenediamine, and a known epoxy resin consisting essentially of an epoxylated phenol-formaldehyde novolac resin having an average oxirane functionality of about 3,3, was made, employing 60% by weight of the former and 40% by weight of the latter. The blend so made had a sufficiently low viscosity to be further compounded at room temperature. It was then admixed with an amount of methylene dianiline sufficient to provide substantially one equivalent amine hydrogen atom thereof per oxirane group present in the mixture.

that prepared in Example 2, viz, N,N-bis(2,3-epoxypropyl) - N' - (pentabromophenyl)ethylenediamine and the weight percent was 35% thereof and 65% of the epoxylated novolac. The blend so made was cured and tested as in Example 4. The results are set out in the table, infra.

EXAMPLE 7

The procedure of Example 4 was again repeated except that the known epoxy resin employed to prepare the blend was N,N-bis(2,3-epoxypropyl) - N' - (pentabromophenyl)ethylenediamine (as in Example 6) and the known epoxy resin was essentially the diglycidyl ether of 4,4'-isopropylidenediphenol (as in Example 5) and the weight percent of each was that of Example 6, viz, 35% of the novel resin of the invention and 65% of the known epoxy resin. The resulting blend was cured and tested according to the procedure followed in Example 4. The results are shown in the table below:

TABLE

| Example No. | Epoxy Resin Blend in Weight Percent | | Physical Properties After Cure [1] | | | |
|---|---|---|---|---|---|---|
| | Resin of Invention | Known Resin | H.D.T.[2] in °C. | Barcol Hardness | Percent Halogen by Weight | Self-Extinguishing [3] |
| 4 | 60% Y,Z which contained one pentachlorinated phenyl group [5]. | 40% polyglycidyl ether of a novolac resin of —CH——CH$_2$ \\O/ functionality of about 3.3. | [4] 141 | 40 | 20.5 | Yes. |
| 5 | ----do---- | 40% of diglycidyl ether of bisphenol A having epoxide equivalent weight of 187-193. | 126 | 40 | 20.5 | Yes. |
| 6 | 35% Y,Z which contained one pentabrominated phenyl group [6]. | 65% polyglycidyl ether of a novolac resin of —CH——CH$_2$ \\O/ functionality of about 3.3. | 162 | 45 | 15.3 | Yes. |
| 7 | ----do---- | 65% diglycidyl ether of bisphenol A having an epoxide equivalent weight of 187-193. | 133 | 30 | 15.3 | Yes. |

[1] The resin blend of each example was cured by admixing therewith methylene dianiline in an amount sufficient to provide about one equivalent weight of amine hydrogen atoms per equivalent weight of oxirane groups. Each curable blend so made was heated 2 hours at 93.5° C. and 4.5 additional hours at 166° C.
[2] H.D.T. means Heat Distortion Temperature according to A.S.T.M. Test 635–56T.
[3] Self-extinguishing tests were conducted according to A.S.T.M. Test D 635–56T.
[4] Example 4 was given an additional 4.5 hours cure at 204° C. and again tested. The H.D.T. following such additional cure was 148° C. and the Barcol Hardness 35.
[5] The resin is substantially N,N-bis(2,3-epoxypropyl)-N'-(pentachlorophenyl)ethylenediamine.
[6] The resin is substantially N,N-bis(2,3-epoxypropyl)-N'-(pentabromophenyl)ethylenediamine.

The resulting curable blend was cast into a mold and the sample so made put in an oven and heated for 2 hours at 93.5° C. and then for an additional 4.5 hours at 166° C.

The blend was thereby cured to a hard tough resin. It was evaluated for heat distortion temperature and Barcol Hardness, the results of which are set out in the table, infra. The sample was then replaced in the oven at 204° C. for an additional 4.5 hours to observe the effect of additional exposure to heat on the heat distortion temperature and Barcol Hardness. The results are shown in Footnote 3 of the table, infra. The chlorine content was calculated and is also set out in the table. The sample was subjected to A.S.T.M. Test D 635–56T and found to be self-extinguishing.

EXAMPLE 5

The procedure of Example 4 was repeated except that the known epoxy resin employed was essentially the diglycidyl ether of 4,4'-isopropylidenediphenol. The weight percent of each in the blend of the two resins was the same as in Example 4. The resulting resin blend was similarly cured as in Example 4, except that it was not given the additional 4.5 hours heating at the increased temperature of 204° C. The cured sample was tested, the results of which are set out in the table, infra.

EXAMPLE 6

The procedure of Example 4 was again repeated except that the resin employed to prepare the blend was Reference to the table shows that the resin of the invention lends itself readily to admixture with conventional epoxy resins to obtain a resin blend which cures readily by known procedures to a hard tough resin having a high heat distortion temperature and which suffers no impairment of the characteristic properties of epoxy resins. Self-extinguishment is thus imparted to the conventional resin, which by itself is flammable, by admixture therewith of a sufficient amount of the diglycidyl ether of the invention. Examples 8 and 9 below were carried out to illustrate the practice of the invention according to Procedure C above, i.e., where an epoxy resin is reacted with the halogenated N-phenylalkylenepolyamine as prepared in Step 1 of Procedure A above (in contrast to blending the epoxylated resin of Procedure A with a known epoxy resin as in Examples 4 to 7 above).

EXAMPLE 8

A reaction product of the diglycidyl ether of 4,4'-isopropylidenediphenol having an epoxide equivalent weight of between 186 and 192, in an amount of 93 grams (to provide 0.5 equivalent of oxirane groups), was admixed with 54 grams of N-pentachlorophenylethylenediamine of the nature of that prepared for epoxylation in Examples 1 to 3. This amount provided 0.35 equivalent of amine hydrogen atoms. The resulting mixture was heated under stirring to a temperature of about 160° C. over a period of 25 minutes, during which the reaction took place. The resin was kept at 160° C. and a vacuum applied for 5 minutes. The resin was then poured on aluminum foil and allowed to solidify. A straw colored material resulted, having the following properties:

Epoxide equivalent weight _____ 1064
Percent chlorine by weight _____ 21.3
Durran's softening point _____ 108.5° C.
Gardner color, 40% resin in solution [1] _____ 6–7
Gardner viscosity, 40% resin in solution [1] ___ K–L

[1] The solvent was diethylene glycol n-butyl ether.

EXAMPLE 9

A similar resin to that of Example 8 was made, using a different amount of the N-phenylalkylenepolyamine to provide ratio of reactants:

Reactant: Amount:
Diglycidyl ether of 4,4-isopropylidenediphenol _____ 93 grams (0.5 equivalent)
Pentachlorophenylethylenediamine _____ 61.5 grams (0.4 equivalent)

The reaction procedure followed was the same as in Example 8 above.

A straw colored resin resulted having the following properties:

Epoxide equivalent weight _____ 1494
Percent chlorine by weight _____ 22.7
Durran's softening point _____ 131.0° C.
Gardner color, 40% resin in solution [1] _____ 6–7
Gardner viscosity, 40% resin in solution [1] __ N

[1] The solvent was diethylene glycol n-butyl ether.

When the procedure designated Procedure D above is to be followed, it is the same as that illustrated for Procedure C except that a non-ether type of diepoxide is substituted for the diglycidyl ether of the type used in Examples 8 and 9.

Examples 10 and 11 below illustrate the composition of the invention prepared according to Procedure E, i.e., by reacting the epoxylated resin or final product prepared according to Procedure A above with a phenol or a bisphenol.

EXAMPLE 10

The following reaction mixture was prepared:

4,4'-isopropylidenediphenol _____ 19 grams (0.167 equivalent)
Epoxylated N-pentachlorophenylethylenediamine _____ 77.7 g. (0.333 equivalent)

The reaction conditions were similar to those followed in Examples 8 and 9 above. A dark colored resin having the following properties was obtained:

Epoxide equivalent weight _____ 1219
Percent by weight Cl _____ 33.2
Durran's softening point _____ 104.8° C.
Gardner color, 40% resin in solution [1] _____ 6–7
Gardner viscosity, 40% resin in solution [1] ___ C

[1] The solvent was diethylene glycol n-butyl ether.

EXAMPLE 11

A resin similar to that of Example 10 was prepared except that a different amount of the 4,4'-isopropylidenediphenol was employed. The amounts of reactants were:

Reactant: Amount
4,4'-isopropylidenediphenol ____ 15.2 grams (0.33 equivalent)
Epoxylated N-pentachlorophenylethylenediamine _____ 77.7 g. (0.133 equivalent)

The procedure followed was substantially the same as in Example 10. A dark colored resin, having the following properties, resulted:

Epoxide equivalent weight _____ 999
Percent by weight Cl _____ 36.3
Durran's softening point _____ 87° C.
Gardner color, 40% resin in solution [1] _____ 10–11
Gardner viscosity, 40% resin in solution [1] _____ A

[1] The solvent was diethylene glycol n-butyl ether.

The resins of Examples 8 to 11 may be cured by admixture therewith of any of the curing agents known either to coreact with oxirane groups (and usually also with the hydroxyl groups when present) or to serve as a cross-linking catalyst and thereafter cast, molded or otherwise shaped or employed as an impregnant, encapsulant, laminant, coating, or be otherwise applied, preferably followed by heating it between about 100° C. and about 225° C.

The resins of the invention can be more economically made than known resins exhibiting comparable properties. The uncured resin employing the chlorinated ethylenepolyamine has a markedly lower viscosity which makes it especially adaptable for blending with known epoxy resins prior to cure.

When cured, the resin of the invention including that prepared by any of the alternate procedures described above, is durable and resistant to corrosion, abrasion, cracking, peeling, and the like. It exhibits good thermal and electrical properties and is self-extinguishing.

Having described my invention, what I claim and desire to protect by Letters Patent is:

1. The epoxy resin composition prepared by epoxidizing terminal amino groups of a halogenated phenyldiamine selected from the class consisting of:

(1) 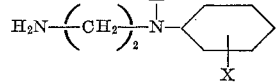

wherein x represents a total of 5 substituents, at least 2 of which are selected from the class consisting of Br and Cl and the balance is H, and (2) 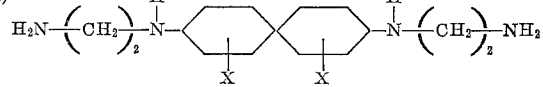

wherein each x represents a total of 4 substituents, at least 2 of which are selected from the class consisting of Br and Cl and the balance is H.

2. The epoxy resin composition consisting essentially of bis[N,N - bis(2,3 - epoxypropyl)-N'-(polyhalophenyl) ethylenediamine] wherein said polyhalo substituents, per phenyl group, are selected from the class consisting of from 1 to 4 bromine substituents, from 2 to 4 chlorine substituents, and from 2 to 4 total of both bromine and chlorine substituents per phenyl group.

3. The epoxy resin composition consisting essentially of N,N - bis(2,3 - epoxypropyl)-N'-(pentachlorophenyl) ethylenediamine.

4. The epoxy resin composition having the structure:

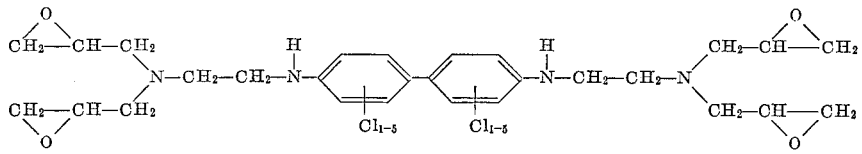

5. The moldable curable resin composition consisting of the epoxy resin composition of claim 1 having admixed therewith a hardening agent selected from the class consisting of primary, secondary, and tertiary aliphatic and aromatic amines, dicarboxylic acids and anhydrides thereof, and di- and polyphenols in an amount sufficient to effect cross-linking of oxirane groups in said epoxy resin composition.

6. The moldable curable resin composition consisting of the epoxy resin composition of claim 2 and a hardening agent selected from the class consisting of primary, secondary, and tertiary aliphatic and aromatic amines, dicarboxylic acids and anhydrides thereof, and di-and polyphenols, in an amount sufficient to effect cross-linking of oxirane groups in said epoxy resin composition.

7. The moldable curable resin composition consisting of the epoxy resin composition of claim 3 and a hardening agent selected from the class consisting of primary, secondary, and tertiary aliphatic and aromatic amines, dicarboxylic acids and anhydrides thereof, and di- and polyphenols, in an amount sufficient to effect cross-linking of the oxirane groups in said epoxy resin composition.

8. The moldable curable resin composition consisting of the epoxy resin composition of claim 4 and a hardening agent selected from the class consisting of primary, secondary, and tertiary aliphatic and aromatic amines, dicarboxylic acids and anhydrides thereof, and di- and polyphenols, in an amount sufficient to effect cross-linking of the oxirane groups in said epoxy resin composititon.

9. The hard durable, self-extinguishing resin having a high heat distortion temperature consisting of the curable resin of claim 5 after being heated at between about 25° and about 225° C. for from about 1 to about 24 hours.

10. The hard durable, self-extinguishing resin having a high heat distortion temperature consisting of the resin of claim 6 after being heated at between about 25° and about 215° C. for from about 1 to about 24 hours.

11. The hard durable, self-extinguishing resin having a high heat distortion temperature consisting of the curable resin of claim 7 after being heated at between about 25° and 225° C. for from 1 to about 24 hours.

12. The hard durable self-extinguishing resin having a high heat distortion temperature consisting of the curable resin of claim 8 after being heated at between 25° and 225° C. for from 1 to about 24 hours.

References Cited by the Examiner

UNITED STATES PATENTS

| 2,829,164 | 4/1958 | Rocklin | 260—47 |
| 2,891,970 | 6/1959 | Frank et al. | 260—2 |
| 2,951,822 | 9/1960 | Reinking | 260—47 |
| 2,959,571 | 11/1960 | Faerber | 260—47 |

WILLIAM H. SHORT, *Primary Examiner.*

T. D. KERWIN, *Assistant Examiner.*